United States Patent Office 3,127,358
Patented Mar. 31, 1964

3,127,358
POLYMERIZATION OF EPOXIDES
Fred N. Hill, South Charleston, W. Va., assignor to Union
Carbide Corporation, a corporation of New York
No Drawing. Filed May 18, 1960, Ser. No. 29,784
7 Claims. (Cl. 260—2)

This invention relates to the polymerization of vicinal-epoxy monomers. In one aspect, the invention relates to a polymerization process whereby the reduced viscosity, i.e., molecular weight, of the polymeric product resulting therefrom can be essentially controlled.

The relative high molecular weight olefin oxide polymers, e.g., those having an average molecular weight of several hundred thousand, and higher, have commercial utility for a wide variety of applications and uses. However, for various other fields of applications it is extremely desirable to employ a relatively lower molecular weight polymer. For instance, where the uses intended for the polymer require a high concentration of solids in solution without producing a solution that is extremely viscous so as to be difficult to handle or process, a relatively low molecular weight polymer is desired. One could molecularly degrade the relatively high molecular weight polymers by physical or mechanical means to produce a correspondingly lower molecular weight product; however, the inconvenient and uneconomical aspects of such degradation procedures are manifest.

In accordance with the invention, it has been discovered that the addition of an organic nitrile to the polymerization system, i.e., a system containing epoxide monomer, catalyst and inert medium (said system to be described hereinafter in detail), will result in a polymeric product whose molecular weight, in general, is lower by a factor of up to ten, and more, than the polymeric product produced from the corresponding polymerization system to which no organic nitrile has been added. Furthermore, one practicing the invention can literally control or predict the ultimate molecular weight of the polymeric product within a high degree of accuracy.

In practice, it is preferred to add the organic nitrile to the polymerization system as soon as the initial epoxide monomer charge is brought into contact with the catalyst. In general, the concentration of the added organic nitrile is in the range of from about 5, and lower, to about 100, and higher, weight percent, based on the weight of contained metal in the catalyst, i.e., the so-called "doubly-modified" alkaline earth metal amide catalysts described more fully at a later section. A preferred concentration is from about 10 to about 40 weight percent organic nitrile, based on the weight of contained metal in the catalyst. In addition, it is desirable, also, that the concentration of the added organic nitrile be in the range of from about 0.001, and lower, to about 0.5, and higher, weight percent, based on the weight of the inert normally-liquid organic vehicle (described hereinafter), and preferably from about 0.005 to about 0.3 weight percent, based on the weight of the inert normally-liquid organic vehicle.

The organic nitriles which can be added to the polymerization system include, for example, the aliphatic nitriles such as, acetonitrile, propionitrile, butyronitrile, valeronitrile, isovaleronitrile, capronitrile, caprylonitrile, caprinitrile, pentadecanenitrile, and the like. The lower saturated aliphatic hydrocarbon nitriles, e.g., acetonitrile, propionitrile, butyronitrile, and the like, are preferred. Acetonitrile is most preferred.

The polymerization system, as indicated previously, comprises the "doubly-modified" alkaline earth metal amide catalyst, the epoxide monomer reagent, and an inert normally-liquid organic vehicle. The so-called "doubly-modified" alkaline earth metal amides are prepared by the mutual reaction and/or interaction of an alkaline earth metal hexammoniate, an olefin oxide, and an organic nitrile. This reaction is carried out in a liquid ammonia medium. In principle, the reaction temperature can range from above about the freezing point of ammonia, i.e., about −78° C., to the critical temperature of ammonia, i.e., about +133° C. The preservation of a liquid ammonia phase obviously requires pressurized equipment at reaction temperatures above the atmospheric boiling point of ammonia, i.e., about −33° C. A reaction temperature in the range of from above about the freezing point of the liquid ammonia medium to about 25° C. is preferred. In a more preferred aspect the upper temperature is about 10° C.

In the preparation of the "doubly-modified" alkaline earth metal amides, the ratio of the three components, i.e., alkaline earth metal hexammoniate, olefin oxide, and organic nitrile, can be varied over a wide range. In general, active catalysts can be prepared by employing from about 0.3 to 1.0 mol of olefin oxide per mol of metal hexammoniate, and from about 0.2 to 0.8 mol of organic nitrile per mol of metal hexammoniate. Highly desirable catalysts can be prepared by employing from about 0.4 to 1.0 mol of olefin per mol of metal hexammoniate, and from about 0.3 to 0.6 mol of organic nitrile per mol of metal hexammoniate. The olefin oxides employed in the preparation of the catalyst are those containing solely carbon, hydrogen, and oxirane oxygen which is bonded to vicinal or adjacent carbon atoms to form an epoxy group, i.e.,

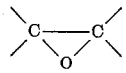

Illustrative olefin oxides include, among others, ethylene oxide, propylene oxide, 1,2-epoxybutane, 2,3-epoxybutane, the epoxypentanes, the epoxyhexanes, the epoxyoctanes, the epoxydecanes, the epoxydodecanes, 2,4,4-trimethyl-1,2-epoxypentane, 2,4,4-trimethyl-2,3-epoxypentane, styrene oxide, cyclohexylepoxyethane, 1-phenyl-1,2-epoxypropane, 7-oxabicyclo[4.1.0]heptane, 6-oxabicyclo[3.1.0]-hexane, 3-methyl-6-oxabicyclo[3.1.0]hexane, 4-ethyl-6-oxabicyclo[3.1.0]hexane, and the like. Lower olefin oxides are preferred, that is, ethylene oxide, propylene oxide, 1,2-epoxybutane, 2,3-epoxybutane, and the like. The organic nitriles which are employed in the catalyst preparation are, preferably, the saturated aliphatic nitriles. Among the organic nitriles which are contemplated include, for example, acetonitrile, propionitrile, butyronitrile, valeronitrile, isovaleronitrile, capronitrile, caprylonitrile, caprinitrile, tridecanenitrile, and the like. Lower saturated aliphatic nitriles are preferred, that is acetonitrile, propionitrile, butyronitrile, and the like. Acetonitrile is most preferred.

During the preparation of the catalysts, the storage or transportation of same, and their use as catalysts to effect polymerization of epoxide monomers, it is highly desirable to conduct these operations in the essential absence of impurities which can deleteriously affect said operations such as oxygen, carbon dioxide, water, and the like.

The preparation of the catalysts can be suitably carried out by dissolving alkaline earth metal in excess liquid ammonia medium, the reaction vessel being contained in, for example, a Dry Ice-acetone slush bath. To the resulting alkaline earth metal hexammoniate in liquid ammonia medium, there are added the olefin oxide and organic nitrile reagents, preferably as a mixture. If desired, the olefin oxide and organic nitrile reagents can be added separately; however, it is preferred that the separate addition of said reagents to the ammonia solution be conducted simultaneously. During the catalyst preparation, agitation of the reaction mixture is desirable. Subsequently, the Dry Ice-acetone bath is removed, and the reaction vessel is exposed to room temperature conditions. After a period of time the excess ammonia weathers or evaporates from the reaction product leaving solid catalytically active material in the reaction vessel. After this, the catalytically active material can be suspended or slurried in an inert, normally-liquid organic vehicle such as, for example, lower dialkyl ether of alkylene glycol, e.g., the dimethyl, diethyl, or dipropyl ethers of diethylene glycol; dioxane; saturated and cycloaliphatic hydrocarbons, e.g., hexane, heptane, cyclohexane, or 2-methylcycloheptane; and the like.

The "doubly-modified" alkaline earth metal amide catalysts are useful in effecting the polymerization of epoxide monomers which contain a cyclic group composed of two carbon atoms and one oxygen atom, i.e., a vicinal-epoxy group. These epoxide monomers can be characterized by the following formula:

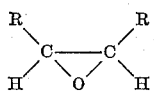

wherein each R, individually, can be hydrogen or a hydrocarbon radical free from ethylenic and acetylenic unsaturation such as, for example, alkyl, aryl, cycloalkyl, aralkyl, or alkaryl radicals. In addition, both R variables together with the epoxy carbon atoms, i.e., the carbon atoms of the epoxy group,

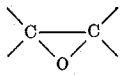

can represent a saturated cycloaliphatic hydrocarbon nucleus containing from 4 to 10 carbon atoms, preferably from 4 to 8 carbon atoms, for example, a saturated cycloaliphatic hydrocarbon nucleus derived from cycloalkane, alkyl substituted cycloalkane, cyclopentane, cyclohexane, cycloheptane, cyclooctane, methylcyclopentane, ethylcyclohexane, amylcyclohexane, and the like. Illustrative R radicals include, among others, methyl, ethyl, propyl, butyl, isobutyl, hexyl, isohexyl, 3-propylheptyl, dodecyl, octadecyl, phenyl, benzyl, tolyl, ethylphenyl, butylphenyl, phenethyl, phenylpropyl, cyclopentyl, cyclohexyl, 2-methylcyclohexyl, cycloheptyl, and the like.

Representative epoxide monomers which can be employed in the polymerization process include, for example, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2-epoxyoctadecane, 5-benzyl-2,3-epoxyheptane, 4-cyclohexyl-2,3-epoxypentane, styrene oxide, the oxabicycloalkanes and the alkyl-substituted oxabicycloalkanes, e.g., 7-oxabicyclo[4.1.0]heptane, 6-oxabicyclo[3.1.0]hexane, 4-propyl-7-oxabicyclo[4.1.0]heptane, 3-amyl-6-oxabicyclo[3.1.0]hexane, and the like. It is preferred that the epoxide monomer be a lower olefin oxide, that is, ethylene oxide, propylene oxide, 1,2-epoxybutane, 2,3-epoxybutane, and the like. Ethylene oxide is highly preferred. A single epoxide monomer or a mixture of at least two different epoxide monomers can be employed as the monomer feed.

The third component of the polymerization system is an inert normally-liquid organic vehicle. Typical vehicles include, for instance, the aromatic hydrocarbons, e.g., benzene, toluene, xylene, ethylbenzene, chlorobenzene, and the like; various oxygenated organic compounds such as anisole, the dimethyl and diethyl ethers of ethylene glycol, of propylene glycol, of diethylene glycol and the like; normally-liquid saturated hydrocarbons including the open chain, cyclic, and alkyl-substituted cyclic saturated hydrocarbons, such as hexane, heptane, isoheptane, various normally-liquid petroleum hydrocarbon fractions, cyclopentane, cyclohexane, the alkylcyclohexanes, decahydronaphthalene, and the like. It is extremely preferred to conduct the polymerization process via the suspension polymerization route, that is, in the presence of an inert normally-liquid organic vehicle in which the monomeric feed is soluble and the resulting polymeric product is insoluble. The dialkyl ethers and saturated hydrocarbons illustrated previously are examples of vehicles applicable in the suspension polymerization route. The amount of inert normally-liquid organic vehicle employed can be varied over a wide range as is well known in the art. In general, the concentration of the inert normally-liquid organic vehicle can be in the range of from about 5 to about 95 weight percent, based on the total weight of epoxide monomer and said vehicle, and preferably from about 25 to 85 weight percent.

The "doubly-modified" alkaline earth metal amides are employed in the polymerization process in catalytically significant quantities. In general, a catalyst concentration in the range of from about 0.02, and lower, to about 10, and higher, weight percent, based on the weight of total monomeric feed, is suitable. A catalyst concentration in the range of from about 0.1 to about 3 weight percent, based on the weight of total monomer feed, is preferred. For optimum results, the particular catalyst employed, its preparation, its surface area, the nature of the monomeric reagent(s), the temperature at which the polymerization reaction is conducted, and other factors will largely determine the desired catalyst concentration.

The polymerization reaction can be conducted over a wide temperature range. Depending on various factors such as the nature of the epoxide monomer(s) employed, the particular catalyst employed, the concentration of the catalyst, and the like, the reaction temperature can be as low as $-30°$ C. and as high as $+150°$ C. A suitable temperature range is from about $0°$ C. to about $150°$ C. For the preperation of granular poly(ethylene oxide) a reaction temperature below about $70°$ C. is suitable. It should be noted that granular poly(ethylene oxide) results from the suspension polymerization of an agitated reaction mixture comprising ethylene oxide in contact with the catalysts previously described, the suspension polymerization reaction being conducted at a temperature below about the softening point of the resulting granular poly(ethylene oxide) product. A suitable temperature range is from about $-30°$ C. to $+65°$ C., and preferably from about $0°$ C. to $60°$ C. Agitation of the reaction mixture is necessary in order to maintain catalyst suspended in said reaction mixture during the course of the polymerization reaction.

In general, the reaction time will vary depending on the operative temperature, the nature of the epoxide reagent(s) employed, the particular catalyst and the concentration employed, the surface area of the catalyst employed, the use of an inert diluent, and other factors. The reaction time can be as short as minutes in duration or it can be as long as several days.

The polymerization reaction preferably takes place in the liquid phase. Preferably, the polymerization reaction is conducted under an inert atmosphere, e.g., nitrogen. It is also highly desirable to effect the polymerization process under substantially anhydrous conditions. Impurities such as water, aldehyde, carbon dioxide, and oxygen which may be present in the olefin oxide feed and/or reaction equipment should be avoided. The polymerization reaction can be conducted in batch, semi-continuous, and continuous fashion.

Unreacted monomeric reagent oftentimes can be recovered from the reaction product by conventional techniques such as by heating said reaction product under reduced pressure. The polymer product also can be recovered from the reaction product by washing said reaction product with an inert, normally-liquid organic medium, and subsequently drying same under reduced pressure at slightly elevated temperatures. Another route involves dissolution in a first inert organic medium, followed by the addition of a second inert organic medium which is miscible with the first medium but which is a nonsolvent for the polymer product, thus precipitating the polymer product. Recovery of the precipitated polymer can be effected by filtration, decantation, etc., followed by drying same as indicated previously. Granular poly(ethylene oxide) can be recovered from the reaction product by filtration, decantation, etc., followed by drying said granular poly(ethylene oxide) under reduced pressure at slightly elevated temperatures, e.g., about 30° C. to 40° C. If desired, the granular poly(ethylene oxide), prior to the drying step, can be washed with an inert, normally-liquid organic medium in which the granular polymer is insoluble, e.g., heptane, cyclohexane, and the like, and then dried as illustrated above.

The solid polymers prepared in accordance with the teachings of this invention are a useful class of compounds. The ethylene oxide polymers are hard, firm, tough and resinous in character, and they have a reduced viscosity value of at least about 0.5, and higher, in acetonitrile. The ethylene oxide polymers appear to form homogeneous systems with water in all proportions. The water solutions are viscous, the viscosity increasing both with the concentration of the polymer and the molecular weight of the polymer. The ethylene oxide polymers show little change in melting point with increased molecular weight and the melting point, as measured by change in stiffness with temperature, is found to be about 65° C. ±2° C. The crystallization temperature, as determined by measuring the break in the cooling curve, is about 55° C. The ethylene oxide polymers produced in accordance with the teachings disclosed herein have a reduced viscosity value in the range of from about 0.5 to about 10, and higher, and preferably from about 1.0 to about 5.

The solid polymers are useful for the production of various shaped articles, e.g., lamp bases, paper weights, thickeners, lubricants, etc. The water-soluble and water-insoluble solid polymers are also useful in the preparation of films by conventional techniques such as by milling on a two-roll mill, calendering, solvent casting, and the like. The homopolymers of the lower olefin oxides and the copolymers containing a lower olefin oxide as a comonomer are preferred polymeric classes. Those copolymers containing ethylene oxide, and in particular greater than about 50 weight percent ethylene oxide, are especially preferred polymeric classes.

The unexpected and unobvious results which accrue by the practice of the invention are especially noteworthy. For instance, should one desire to employ greater than 0.8 mol of organic nitrile per mol of metal hexammoniate during the preparation of the "double modified" alkaline earth metal amide catalyst, there would result a catalyst of drastically reduced activity or a catalyst of essentially no activity. However, one can employ in the polymerization system an active "doubly modified" alkaline earth metal amide catalyst which has been prepared by reacting up to 0.8 mol of organic nitrile (preferably up to 0.6 mol of organic nitrile) per mol of metal hexammoniate, and to said polymerization system there can be added up to 100 weight percent organic nitrile (based on weight of contained metal in the catalyst). Under these conditions, the catalyst would still exhibit substantial catalytic activity and the resulting polymeric product would be of relatively lower molecular weight than the polymeric product produced from the corresponding polymerization system to which no organic nitrile has been added. For many uses and applications, a relatively lower molecular weight polymeric product is highly useful, e.g., coatings, films, and the like. Moreover, it has been observed that if an amount (X) of organic nitrile used to prepare the "doubly modified" catalyst plus an amount (Y) of organic nitrile added to the polymerization system fall within the range of about 0.3 to about 0.8 mol (per mol of metal hexammoniate), the resulting polymeric product would still be of lower molecular weight than the corresponding polymeric product resulting from the use of a "doubly modified" catalyst whose preparation entailed X plus Y amounts of organic nitrile. In addition, as will become apparent from the operative examples below, the ultimate molecular weight of the resulting polymeric product can be controlled within a predictable degree of accuracy.

The term "reduced viscosity" is employed at various times in the specification. By the term "reduced viscosity," as used herein including the appended claims, is meant a value obtained by dividing the specific viscosity by the concentration of the polymer in the solution, the concentration being measured in grams of polymer per 100 milliliters of solvent at a given temperature. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, i.e., acetonitrile, at 30° C.

The following examples are illustrative.

*Example 1*

Liquid ammonia (2 liters) was added to a resin flask (maintained in a Dry Ice-acetone bath, the temperature of which was about −70° C.). Calcium metal nodules (40 grams) was then dissolved in the stirred liquid ammonia. The characteristic deep blue color of calcium hexammoniate appeared. To the resulting solution there were slowly added 20 grams of acetonitrile. During the addition of acetonitrile, the blue color of the calcium hexammoniate solution disappeared; the resulting reaction mixture was grayish-white in color. The external Dry Ice-acetone bath then was removed, and the flask was exposed to room temperature conditions, i.e., approximately 22° C., for 16 hours. After this period of time the liquid ammonia phase had disappeared (weathered or evaporated from the system) and a gray-white solid remained. This solid product was placed in a stainless steel container, and said product was covered with heptane. Subsequently, this admixture was agitated in a reciprocating paint shaker for one hour thus producing a catalyst slurry or suspension in heptane. Throughout the operation extreme care was taken to exclude the presence of oxygen, water, and carbon dioxide from the reaction system.

*Example 2*

To a 2-liter glass resin flask equipped with a stirrer, thermometer, inlet conduit in the lower portion of the flask, and an outlet conduit connected to an exhaust system, there were charged 100 grams of liquid ethylene oxide, one liter of heptane, and a quantity of the catalyst suspension prepared as set forth in Example 1 supra, said catalyst suspension containing 1.0 gram of calcium calculated as the metal. Gaseous ethylene oxide was introduced into the resin flask via the inlet conduit and bubbled through the resulting admixture during the course of the polymerization reaction. Excess ethylene oxide was removed via the outlet conduit. In this manner, the reaction medium was continuously saturated with ethylene oxide. The polymerization reaction was maintained at 18° to 29° C. for a period of 5 hours. The resulting finely-divided polymer was recovered from the reaction product by filtration, followed by overnight drying same at room temperature, i.e., about 22° C. There were obtained 28 grams of white, granular poly(ethylene oxide) which had a reduced viscosity value in acetonitrile of 36.2.

*Example 3*

To the equipment described in Example 2, there were charged one liter of heptane, 100 grams of liquid ethylene oxide, and a quantity of calcium amide, $Ca(NH_2)_2$, which contained 1.0 gram of calcium calculated as the metal.

Ethylene oxide was bubbled through the resulting admixture in the same manner as explained in Example 2. The polymerization reaction was maintained at 18° to 31° C. for a period of 7 hours. The resulting finely-divided polymer was recovered from the reaction product by filtration, followed by drying same at room temperature under reduced pressure. There were obtained 32 grams of granular poly(ethylene oxide) which had a reduced viscosity value in acetonitrile of 48.0.

*Example 4*

A catalyst was prepared in the same manner as set forth in Example 1 supra except that a mixture of 11 grams of acetonitrile and 29 grams of propylene oxide was used in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing 1.0 gram of calcium calculated as the metal. Ethylene oxide was bubbled through the resulting admixture in the same manner as explained in Example 2. The polymerization reaction was maintained at 24° to 50° C. for a period of 5.5 hours. The resulting finely-divided polymer was recovered from the reaction product by filtration, followed by drying same at room temperature under reduced pressure. There were obtained 191 grams of white, granular poly(ethylene oxide) which had a reduced viscosity value in acetonitrile of 17.6.

*Example 5*

To the equipment described in Example 2, there were charged one liter of heptane, 100 grams of liquid ethylene oxide, and a quantity of the catalyst slurry employed in Example 4 above, said catalyst slurry containing 1.0 gram of calcium calculated as the metal. Immediately following the catalyst addition to the admixture of ethylene oxide and heptane, there was added 0.5 cc. of acetonitrile thereto. Ethylene oxide was bubbled through the resulting admixture in the same manner as explained in Example 2. The polymerization reaction was maintained at a temperature below about 50° C. for a period of 5.5 hours. The resulting finely-divided polymer was recovered from the reaction product by filtration, followed by drying same at room temperature under reduced pressure. There were obtained 99 grams of white, granular poly(ethylene oxide) which had a reduced viscosity value in acetonitrile of 5.9.

In an analogous manner, the use of a catalyst which is prepared according to Example 1 except that 88 grams of strontium and 22 grams of ethylene oxide are substituted for the 40 grams of calcium results, under the conditions noted in the previous paragraph, in the production of a solid polymeric product.

*Example 6*

To the equipment described in Example 2, there were charged one liter of heptane, 100 grams of liquid ethylene oxide, and a quantity of the catalyst slurry employed in Example 4 above, said catalyst slurry containing 1.0 gram of calcium calculated as the metal. Immediately following the catalyst addition to the admixture of ethylene oxide and heptane, there was added 1.0 cc. of acetonitrile thereto. Ethylene oxide was bubbled through the resulting admixture in the same manner as explained in Example 2. The polymerization reaction was maintained at a temperature below about 50° C. for a period of 5.5 hours. The resulting finely-divided polymer was recovered from the reaction product by filtration, followed by drying same at room temperature under reduced pressure. There were obtained 69 grams of white, granular poly(ethylene oxide) which had a reduced viscosity value in acetonitrile of 3.3.

In an analogous manner, the use of a catalyst which is prepared according the Example 1 except that 137 grams of barium and 22 grams of ethylene oxide are substituted for the 40 grams of calcium results, under the conditions noted in the previous paragraph, in the production of a solid polymeric product.

*Example 7*

A catalyst was prepared in the same manner as set forth in Example 1 supra except that a mixture of 11 grams of acetonitrile and 44 grams of propylene oxide was used in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing 1.0 gram of calcium calculated as the metal. Ethylene oxide was bubbled through the resulting admixture in the same manner as explained in Example 2. The polymerization reaction was maintained at 19° to 51° C. for a period of 5.5 hours. The resulting finely-divided polymer was recovered from the reaction product by filtration, followed by drying same at room temperature under reduced pressure. There were obtained 197 grams of white, granular poly(ethylene oxide) which had a reduced viscosity value in acetonitrile of 13.4.

*Example 8*

To the equipment described in Example 2, there were charged one liter of heptane, 100 grams of liquid ethylene oxide, and a quantity of the catalyst slurry employed in Example 7 above, said catalyst slurry containing one gram of calcium calculated as the metal. Immediately following the catalyst addition to the admixture of ethylene oxide and heptane, there was added 1.0 cc. of acetonitrile thereto. Ethylene oxide was bubbled through the resulting admixture in the same manner as explained in Example 2. The polymerization reaction was maintained at a temperature below about 50° C. for a period of 5.5 hours. The resulting finely-divided polymer was recovered from the reaction product by filtration, followed by drying same at room temperature under reduced pressure. There were obtained 66 grams of white, granular poly(ethylene oxide) which had a reduced viscosity value in acetonitrile of 2.5.

In an analogous manner as above, when 1,2-propylene oxide is employed as the monomeric feed in lieu of ethylene oxide, there is obtained a solid polymeric product.

*Example 9*

To the equipment described in Example 2, there were charged one liter of heptane, 100 grams of liquid ethylene oxide, and a quantity of the catalyst slurry employed in Example 7 above, said catalyst slurry containing one gram of calcium calculated as the metal. Immediately following the catalyst addition to the admixture of ethylene oxide and heptane, there was added 0.5 cc. of acetonitrile thereto. Ethylene oxide was bubbled through the resulting admixture in the same manner as explained in Example 2. The polymerization reaction was maintained at a temperature below about 50° C. for a period of 5.5 hours. The resulting finely divided polymer was recovered from the reaction product by filtration, followed by drying same at room temperature under reduced pressure. There were obtained 58 grams of white, granular poly(ethylene oxide) which had a reduced viscosity value in acetonitrile of 3.0.

In an analogous manner, the use of a catalyst which is prepared according to Example 1 except that 35 grams of n-butyronitrile and 58 grams of propylene oxide are substituted for the 20 grams of acetonitrile results, under the conditions noted in the previous paragraph, in the production of a solid polymeric product.

*Example 10*

A catalyst was prepared in the same manner as set forth in Example 1 supra except that a mixture of 23 grams of acetonitrile and 29 grams of propylene oxide were employed in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing one gram of calcium calculated as the metal. Ethylene oxide was bubbled through the resulting admixture in the same manner as explained in Example 2. The polymerization reaction was maintained at a temperature below about 50° C. for a period of 5.5 hours. The resulting finely-divided polymer was recovered from the reaction product by filtration, followed by drying same at room temperature under reduced pressure. There were obtained 200 grams of white, granular poly(ethylene oxide) which had a reduced viscosity value in acetonitrile of 11.4.

*Example 11*

To the equipment described in Example 2, there were charged one liter of heptane, 100 grams of liquid ethylene oxide, and a quantity of the catalyst slurry employed in Example 10 above, said catalyst slurry containing one gram of calcium calculated as the metal. Immediately following the catalyst addition to the admixture of ethylene oxide and heptane, there was added 0.5 cc. of acetonitrile thereto. Ethylene oxide was bubbled through the resulting admixture in the same manner as explained in Example 2. The polymerization reaction was maintained at a temperature below about 50° C. for a period of 5.5 hours. The resulting finely-divided polymer was recovered from the reaction product by filtration, followed by drying same at room temperature under reduced pressure. There were obtained 105 grams of white, granular poly(ethylene oxide) which had a reduced viscosity value in acetonitrile of 5.0.

*Example 12*

To the equipment described in Example 2, there were charged one liter of heptane, 100 grams of liquid ethylene oxide, and a quantity of the catalyst slurry employed in Example 10 above, said catalyst slurry containing one gram of calcium calculated as the metal. Immediately following the catalyst addition to the admixture of ethylene oxide and heptane, there was added 1.0 cc. of acetonitrile thereto. Ethylene oxide was bubbled through the resulting admixture in the same manner as explained in Example 2. The polymerization reaction was maintained at a temperature below about 50° C. for a period of 5.5 hours. The resulting finely-divided polymer was recovered from the reaction product by filtration, followed by drying same at room temperature under reduced pressure. There were obtained 78 grams of white, granular poly(ethylene oxide) which had a reduced viscosity value in acetonitrile of 2.5.

*Example 13*

A catalyst was prepared in the same manner as set forth in Example 1 supra except that a mixture of 23 grams of acetonitrile and 58 grams of propylene oxide were employed in lieu of 20 grams of acetonitrile.

To the equipment described in Example 2, there were charged one liter of heptane, 100 grams of liquid ethylene oxide, and a quantity of the catalyst slurry prepared as described above, said catalyst slurry containing one gram of calcium calculated as the metal. Ethylene oxide was bubbled through the resulting admixture in the same manner as explained in Example 2. The polymerization reaction was maintained at a temperature below about 50° C. for a period of 5.5 hours. The resulting finely-divided polymer was recovered from the reaction product by filtration, followed by drying same at room temperature under reduced pressure. There were obtained 142 grams of white, granular poly(ethylene oxide) which had a reduced viscosity value in acetonitrile of 6.1.

*Example 14*

To the equipment described in Example 2, there were charged one liter of heptane, 100 grams of liquid ethylene oxide, and a quantity of the catalyst slurry employed in Example 13 above, said catalyst slurry containing one gram of calcium calculated as the metal. Immediately following the catalyst addition to the admixture of ethylene oxide and heptane, there was added 0.5 cc. of acetonitrile thereto. Ethylene oxide was bubbled through the resulting admixture in the same manner as explained in Example 2. The polymerization reaction was maintained at a temperature below about 50° C. for a period of 5.5 hours. The resulting finely-divided polymer was recovered from the reaction product by filtration, followed by drying same at room temperature under reduced pressure. There were obtained 57 grams of white, granular poly(ethylene oxide) which had a reduced viscosity value in acetonitrile of 1.2.

Although the invention has been illustrated by the preceding examples, the invention is not to be construed as limited to the materials employed in the above-exemplary examples, but rather, the invention encompasses the generic area as hereinbefore disclosed. Various modifications and embodiments of this invention can be made without departing from the spirit and scope thereof.

What is claimed is:

1. In a process for producing a polymer of a vicinal-monoepoxyhydrocarbon which comprises contacting in a polymerization zone maintained under substantially anhydrous conditions:
   (a) a vicinal-monoepoxyhydrocarbon monomer free from ethylenic and acetylenic unsaturation,
   (b) an inert normally-liquid organic vehicle, and
   (c) a polymerization catalyst, said catalyst having been prepared by the reaction of alkaline earth metal hexammoniate with from about 0.3 to 1.0 mol of olefin oxide and from about 0.2 to 0.8 mol of saturated aliphatic hydrocarbon nitrile, based on 1.0 mol of said alkaline earth metal hexammoniate, said reaction being conducted in an excess liquid ammonia medium, and subsequently evaporating from the resulting product mixture the excess liquid ammonia, whereby a catalytically active product is obtained, the improvement which comprises controlling the molecular weight of said polymer by adding to said polymerization zone immediately after said vicinal-monoepoxyhydrocarbon monomer is brought into contact with said polymerization catalyst, from about 5 to about 100 weight percent saturated aliphatic hydrocarbon nitrile, based on the weight of contained metal in said polymerization catalyst, whereby the molecular weight of said polymer is less than the molecular weight of the polymer produced from the corresponding polymerization system to which no saturated aliphatic hydrocarbon nitrile has been added.

2. In a process for producing a polymer of a vicinal-monoepoxyhydrocarbon which comprises contacting in a polymerization zone maintained under substantially anhydrous conditions:
   (a) a vicinal-monoepoxyhydrocarbon monomer free from ethylenic and acetylenic unsaturation,
   (b) an inert normally-liquid organic vehicle, and
   (c) a polymerization catalyst, said catalyst having been prepared by the reaction of alkaline earth metal hexammoniate with from about 0.3 to 1.0 mol of lower olefin oxide of from 2 to 4 carbon atoms containing solely carbon, hydrogen, and one oxirane oxygen bonded to vicinal carbon atoms to form an epoxy group and from about 0.2 to 0.8 mol of saturated aliphatic hydrocarbon nitrile, based on 1.0 mol of said alkaline earth metal hexammoniate, said reaction being conducted in an excess liquid ammonia medium, and subsequently evaporating from the resulting product mixture the excess liquid ammonia whereby a catalytically active product is obtained, the improvement which comprises controlling the molecular weight of said polymer by adding to said polymerization zone immediately after said vicinal-monoepoxyhydrocarbon monomer is brought into contact with said polymerization catalyst, from about 5 to about 100 weight percent saturated aliphatic hydrocarbon nitrile, based on the weight of contained metal in said polymerization catalyst, whereby the molecular weight of said polymer is less than the molecular weight of the polymer produced from the corresponding polymerization system to which no saturated aliphatic hydrocarbon nitrile has been added.

3. In a process for producing a polymer of a lower olefin monooxide which comprises contacting in a polymerization zone maintained under substantially anhydrous conditions:
(a) a lower olefin monooxide monomer free from ethylenic and acetylenic unsaturation of from 2 to 4 carbon atoms containing solely carbon, hydrogen, and one oxirane oxygen bonded to vicinal carbon atoms to form an epoxy group,
(b) an inert normally-liquid organic vehicle, and
(c) a polymerization catalyst, said catalyst having been prepared by the reaction of alkaline earth metal hexammoniate with from about 0.4 to 1.0 mol of lower olefin oxide of from 2 to 4 carbon atoms containing solely carbon, hydrogen, and one oxirane oxygen bonded to vicinal carbon atoms to form an epoxy group and from about 0.3 to 0.6 mol of saturated aliphatic hydrocarbon nitrile, based on 1.0 mol of said alkaline earth metal hexammoniate, said reaction being conducted in an excess liquid ammonia medium, and subsequently evaporating from the resulting product mixture the excess liquid ammonia whereby a catalytically active product is obtained,
the improvement which comprises controlling the molecular weight of said polymer by adding to said polymerization zone immediately after said lower olefin monooxide monomer is brought into contact with said polymerization catalyst, from about 10 to about 40 weight percent saturated lower aliphatic hydrocarbon nitrile, based on the weight of contained metal in said polymerization catalyst, whereby the molecular weight of said polymer is less than the molecular weight of the polymer produced from the corresponding polymerization system to which no saturated lower aliphatic hydrocarbon nitrile has been added.

4. In a process for producing a polymer of ethylene oxide which comprises contacting in a polymerization zone maintained under substantially anhydrous conditions:
(a) ethylene oxide,
(b) an inert normally-liquid organic vehicle, and
(c) a polymerization catalyst, said catalyst having been prepared by the reaction of alkaline earth metal hexammoniate with from about 0.4 to 1.0 mol of lower olefin oxide selected from the group consisting of ethylene oxide, propylene oxide, 1,2-epoxybutane, and 2,3-epoxybutane, and from about 0.3 to 0.6 mol of lower saturated aliphatic hydrocarbon nitrile, based on 1.0 mol of said alkaline earth metal hexammoniate, said reaction being conducted in an excess liquid ammonia medium, and subsequently evaporating from the resulting product mixture the excess liquid ammonia whereby a catalytically active product is obtained,
the improvement which comprises controlling the molecular weight of said polymer by adding to said polymerization zone immediately after said ethylene oxide is brought into contact with said polymerization catalyst, from about 5 to about 100 weight percent saturated lower aliphatic hydrocarbon nitrile, based on the weight of contained metal in said polymerization catalyst, whereby the molecular weight of said polymer is less than the molecular weight of the polymer produced from the corresponding polymerization system to which no saturated lower aliphatic hydrocarbon nitrile has been added.

5. In a process for producing a granular polymer of ethylene oxide which comprises contacting in a polymerization zone maintained under substantially anhydrous conditions:
(a) ethylene oxide,
(b) an inert normally-liquid organic vehicle in which ethylene oxide is soluble and the resulting granular polymer of ethylene oxide is insoluble, and
(c) a polymerization catalyst, agitating the polymerization reaction mixture to thus maintain said polymerization catalyst suspended therein while conducting said reaction at a temperature below about the softening point of the resulting granular polymer of ethylene oxide; and wherein said polymerization catalyst has been prepared by the reaction of alkaline earth metal hexammoniate with from about 0.4 to 1.0 mol of lower olefin oxide selected from the group consisting of ethylene oxide, propylene oxide, 1,2-epoxybutane, and 2,3-epoxybutane, and from about 0.3 to 0.6 mol of saturated lower aliphatic hydrocarbon nitrile, based on 1.0 mol of said alkaline earth metal hexammoniate, said reaction being conducted in an excess liquid ammonia medium, and subsequently evaporating from the resulting product mixture the excess liquid ammonia whereby a catalytically active product is obtained,
the improvement which comprises controlling the molecular weight of said polymer by adding to said polymerization zone immediately after said ethylene oxide is brought into contact with said polymerization catalyst, from about 5 to about 100 weight percent saturated lower aliphatic hydrocarbon nitrile, based on the weight of contained metal of said polymer is less than the molecular weight of the polymer produced from the corresponding polymerization system to which no saturated lower aliphatic nitrile has been added.

6. In a process for producing a polymer of ethylene oxide which comprises contacting in a polymerization zone maintained under substantially anhydrous conditions:
(a) ethylene oxide,
(b) heptane and
(c) a polymerization catalyst, said catalyst having been prepared by the reaction of calcium hexammoniate with from about 0.4 to 1.0 mol of ethylene oxide, and from about 0.3 to about 0.6 mol of acetonitrile, based on 1.0 mol of said calcium hexammoniate, said reaction being conducted in an excess liquid ammonia medium and subsequently evaporating from the result-product mixture the excess liquid ammonia whereby a catalytically active product is obtained,
the improvement which comprises controlling the molecular weight of said polymer by adding to said polymerization zone immediately after said ethylene oxide is brought into contact with said polymerization catalyst, from about 10 to about 40 weight percent acetonitrile, based on the weight of contained calcium in said polymerization catalyst, whereby the molecular weight of said polymer is less than the molecular weight of the polymer produced from the corresponding polymerization system to which no acetonitrile has been added.

7. In a process for producing a granular polymer of ethylene oxide which comprises contacting in a polymerization zone maintained under substantially anhydrous conditions:
(a) ethylene oxide,
(b) heptane, and
(c) a polymerization catalyst, agitating the polymerization reaction mixture to thus maintain said polymerization catalyst suspended therein while conducting said reaction at a temperature below about the softening point of the resulting granular polymer of ethylene oxide, and wherein said polymerization catalyst has been prepared by the reaction of calcium hexammoniate with from about 0.4 to 1.0 mol of ethylene oxide, and from about 0.3 to 0.6 mol of acetonitrile, based on 1.0 mol of said calcium hexammoniate, said reaction being conducted in an excess liquid ammonia medium, and subsequently evaporating from the resulting product mixture the excess liquid ammonia whereby a catalytically active product is obtained, the improvement which comprises controlling the molecular weight of said polymer by adding to said polymerization zone, immediately after said ethylene oxide is brought into contact with said polymerization catalyst, from about 10 to about 40 weight percent of acetonitrile, based on the weight of contained calcium in said polymerization catalyst, whereby the molecular weight of said polymer is less than the molecular weight of the polymer produced from the corresponding polymerization system to which no acetonitrile has been added.

References Cited in the file of this patent

UNITED STATES PATENTS

| | | |
|---|---|---|
| 2,969,402 | Hill et al. | Jan. 24, 1961 |
| 3,037,943 | Hill et al. | June 5, 1962 |

FOREIGN PATENTS

| | | |
|---|---|---|
| 620,246 | Canada | May 16, 1961 |